(12) United States Patent
Kremer et al.

(10) Patent No.: US 11,005,319 B2
(45) Date of Patent: May 11, 2021

(54) OPTIMIZED ELECTRICAL MACHINE

(71) Applicant: Robert Bosch GmbH, Stuttgart (DE)

(72) Inventors: Mickael Kremer, Hemmingen (DE);
Sebastian Tabarelli, Herrenberg (DE);
Johannes Riedl, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 162 days.

(21) Appl. No.: 16/461,141

(22) PCT Filed: Sep. 13, 2017

(86) PCT No.: PCT/EP2017/073000
§ 371 (c)(1),
(2) Date: May 15, 2019

(87) PCT Pub. No.: WO2018/091164
PCT Pub. Date: May 24, 2018

(65) Prior Publication Data
US 2019/0280539 A1    Sep. 12, 2019

(30) Foreign Application Priority Data

Nov. 15, 2016  (DE) .................... 10 2016 222 398.4

(51) Int. Cl.
*H02K 1/27* (2006.01)
*H02K 21/16* (2006.01)
*H02K 29/03* (2006.01)

(52) U.S. Cl.
CPC ........... *H02K 1/276* (2013.01); *H02K 1/2766* (2013.01); *H02K 21/16* (2013.01); *H02K 29/03* (2013.01);
(Continued)

(58) Field of Classification Search
CPC .... H02K 1/148; H02K 2201/06; H02K 21/22; H02K 29/03
(Continued)

(56) References Cited

U.S. PATENT DOCUMENTS

2008/0258573 A1* 10/2008 Kamiya ............... F16H 3/727
310/156.02
2013/0106226 A1*  5/2013 Aoyama .............. H02K 29/03
310/156.53
(Continued)

FOREIGN PATENT DOCUMENTS

CN       201113576 Y  *  9/2008
DE       102012219174     5/2013
(Continued)

OTHER PUBLICATIONS

Machine Translation CN201113576 (Year: 2008).*
(Continued)

*Primary Examiner* — Jose A Gonzalez Quinones
(74) *Attorney, Agent, or Firm* — Michael Best & Friedrich LLP

(57) ABSTRACT

An electrical machine (10) for driving a vehicle comprises: a stator (14) having stator grooves (34) running axially and running uniformly around an axis of the electrical machine (10), through which grooves a stator winding (42) runs; and a rotor (12) with axially running poles (16), which rotor is mounted inside the stator (14) for rotation around the axis of the electrical machine (10), wherein two pole magnets (20) with rectangular cross-section are arranged in each pole (16) of the rotor (12) in an axially running pole opening (18) forming a V in respect of one another. The electrical machine (10) is optimized with respect to a plurality of geometrical parameters which have been optimized by optimization of optimization parameters which are determined from the geometric parameters.

14 Claims, 2 Drawing Sheets

(52) U.S. Cl.
CPC ..... *H02K 2201/06* (2013.01); *H02K 2213/03* (2013.01)

(58) Field of Classification Search
USPC ............. 310/156.01, 156.56, 156.57, 156.47
See application file for complete search history.

(56) References Cited

U.S. PATENT DOCUMENTS

2014/0125184 A1* 5/2014 Takahashi ................ H02K 1/27
310/156.53
2015/0311759 A1* 10/2015 Heuser ................... H02K 1/165
310/195

FOREIGN PATENT DOCUMENTS

| DE | 102015203012 | 8/2016 |
| EP | 2498375 | 9/2012 |
| JP | 2008306849 | 12/2008 |
| WO | 2006095887 | 9/2006 |

OTHER PUBLICATIONS

International Search Report for Application No. PCT/EP2017/073000 dated Dec. 6, 2017 (English Translation, 2 pages).

* cited by examiner

OPTIMIZED ELECTRICAL MACHINE

BACKGROUND OF THE INVENTION

The invention relates to an electrical machine, such as an electric motor or a generator.

The use of permanent magnet excited synchronous machines in non-chargeable and chargeable hybrid vehicles is widespread. In the case of synchronous machines which are integrated in a combustion engine, rotors are frequently employed having two magnets in a v-shaped arrangement per pole.

The optimization of electrical machines of this type involves conflicting optimization objectives. For traction drive systems in the electromobility sector, high torque or power densities are required. At the same time, it is necessary for costs, structural space, losses, torque ripple and noise to be minimized.

DE 10 2012 219 174 A1 indicates that, for example, for an electrical machine having a slot number q=2, torque ripple can be minimized if the magnetic aperture angle lies between 76.2% and 81.6%.

EP 2 498 375 A1 describes an electrical machine having a pole coverage factor between 0.45 and 0.55.

WO 2006 095 887 A1 describes an electrical machine with a rotor, having pole openings with a central web, and wherein the pole coverage factor lies between 127° el and 140° el.

It is further known, in synchronous machines which are integrated in a combustion engine, for a stator with a single-tooth winding to be employed, said winding having a slot number q=0.5. This type of winding generally minimizes the length of the winding overhang, and permits the configuration of synchronous machines with a short axial length. At q=0.5, however, the electromagnetic field in the air gap between the rotor and the stator contains a high proportion of harmonics. This results in increased rotor losses and an increase in the temperature of the magnets. For longer machines which are integrated in a combustion engine, an integer-slot winding, for example having a slot number q=2 can be employed, thereby resulting in an electromagnetic field in the air gap containing a lower proportion of harmonics. Reduced eddy current losses will then occur in the magnets, as a result of which, in turn, the temperature of the magnets remains lower, thus permitting the use of magnets with a more cost-effective class rating.

SUMMARY OF THE INVENTION

In order to achieve the above-mentioned optimization objectives, multi-objective optimization can be employed. To this end, a large number of design variants are calculated, and the best combinations of geometrical parameters for the electrical machine can be identified.

Forms of embodiment of the present invention can advantageously permit the provision of electrical machines in which a plurality of properties, including losses, construction costs, efficiency, torque ripple and noise, are optimized in relation to one another.

Concepts for forms of embodiment of the present invention can, inter alia, be considered to be based upon the principles and findings described hereinafter.

The invention relates to an electrical machine for driving a vehicle, including, for example, a private car, an HGV, a bus, etc., in particular a non-chargeable and chargeable hybrid vehicle. The electrical machine can be a permanent magnet excited synchronous machine and/or can be a synchronous machine which is integrated in a combustion engine. For example, the rotor of the electrical machine can be mounted directly on the drive shaft of a combustion engine.

According to one form of embodiment of the invention, the electrical machine comprises a stator having stator grooves running axially, and running uniformly around an axis of the electrical machine, through which grooves a stator winding runs, and a rotor with axially oriented poles, which rotor is mounted inside the stator for rotation about the axis of the electrical machine, wherein two pole magnets of rectangular cross-section are arranged in each pole of the rotor in an axially oriented pole opening, forming a V in respect of one another.

In multi-objective optimization, it has been established that the following geometrical parameters and/or structural variables of the rotor and/or of the stator of an electrical machine of this type result in the optimization of a large number of optimization objectives or optimization parameters, including the achievement of a desired torque or a desired speed of rotation requirement, a maximization of efficiency, a minimization of noise, a minimization of costs, a minimization of torque ripple and a minimization of any short-circuit current or short-circuit losses.

The electrical machine is optimized with respect to a plurality of geometrical parameters, which have been optimized by the optimization of optimization parameters or optimization objectives, which are dictated by said geometrical parameters.

According to one form of embodiment of the invention, in the rotor: the geometrical angular offset of the two pole magnets, by which the two pole magnets are offset in a V-shaped arrangement in relation to one another, is less than 15°; the electrical angle of the outer pole coverage lies between 115.7° el and 133.2° el; and the electrical angle of the inner pole coverage lies between 123.5° el and 142.9° el.

The geometrical angular offset of the two pole magnets can thus be considered as an angle through which the two magnets are rotated in relation to one another such that, in combination, they constitute a V-shape.

An electrical angle can be determined as a geometrical angle multiplied by two times the number of poles of the rotor.

The outer pole coverage can be determined by an axial geometrical angle which the two pole magnets cover on a radially outer side of the pole opening. For example, the outer pole coverage can be determined by the geometrical angle between radially outer edges, that are circumferentially on the outside, of the pole magnets.

The inner pole coverage can be determined by an axial geometrical angle which the two pole magnets cover on a radially inner side of the pole opening. For example, the inner pole coverage can be determined by an axial geometrical angle between radially inner and circumferentially outer edges of the pole magnets.

According to one form of embodiment of the invention, the stator has the following: a ratio of the tooth height to the yoke thickness between 0.959 and 1.126; a ratio of the tooth width to the groove width at the tooth root between 1.23 and 1.35; a ratio of the tooth width to the groove width at the tooth tip between 1.03 and 1.14; and a ratio of the groove width at the tooth root to the groove width at the tooth tip between 0.9 and 1.1.

Both the grooves and the teeth (excluding the tooth tip) can have a trapezoidal cross-section. The grooves can have a rectangular cross-section, which can be advantageous in the case of a plug-winding, as the plugged-in conductors generally have a rectangular cross-section.

The tooth height is the radial height or thickness over which the annular part of the stator extends, which carries teeth or grooves. The yoke thickness is the residual radial height or thickness of the annular part of the stator (i.e. of the yoke) which carries no teeth or grooves. The tooth root is located at the transition between the teeth and the yoke. The tooth tip is the end of a tooth, which is oriented in the direction of the rotor and can optionally be configured with a T-shape. The tooth width and the groove width are defined in the circumferential direction, wherein the definition of the tooth width excludes the T-shaped thickening at the tooth tip.

The stator parameters stated immediately above, in combination with the above-mentioned parameters, result in a particularly optimum electrical machine. However, other combinations of parameters for the stator are possible, as described below.

According to one form of embodiment of the invention, the stator has the following: a ratio of the tooth height to the yoke thickness between 1.395 and 1.6376; a ratio of the tooth width to the groove width at the tooth root between 1.33 and 1.47; a ratio of the tooth width to the groove width at the tooth tip between 1.06 and 1.19; and a ratio of the groove width at the tooth root to the groove width at the tooth tip between 0.9 and 1.1.

According to one form of embodiment of the invention, the external diameter of the stator lies between 110 and 500 mm. The external diameter of the stator is measured from the axis of rotation of the rotor to the outer circumference of the stator or the yoke thereof.

According to one form of embodiment of the invention, the electrical machine has a slot number greater than or equal to 1. The slot number of an electrical machine can be determined by the number of grooves in the stator, divided by the number of phases, and divided by the number of poles of the rotor. For example, an electrical machine with three phases and six slots per pole has a slot number of 2.

Where the slot number is greater than or equal to 1, for example 2, an integer-slot winding can be employed, which can in particular be configured as a plug-winding. By means of a plug-winding, for example, the copper fullness factor can be increased, in the interests of reducing copper losses, and a better thermal connection can be achieved between the winding and the stator. Moreover, in the event of larger component batch sizes, costs can be reduced.

According to one form of embodiment of the invention, the ratio of the internal diameter to the external diameter of the stator lies between 0.75 and 0.85, for example between 0.80 and 0.85. The internal diameter of the stator is measured from the axis of rotation of the rotor to the inner circumference of the stator or the teeth thereof.

According to one form of embodiment of the invention, the ratio between a width of the air gap between the stator and the rotor and the internal diameter of the stator lies between 0.0025 and 0.0055. Between the stator and the rotor, an annular space is constituted, which is known as the air gap. The width of the air gap is determined in the radial direction.

According to one form of embodiment of the invention, the circumferential clearance between two pole magnets in a pole is less than 3.0 mm. If the two pole magnets are not mutually separated by a central web in the pole opening, this clearance can be even smaller, for example less than 1.5 mm.

According to one form of embodiment of the invention, the pole opening is V-shaped and/or has no central web. In other words, the pole opening of one pole can comprise two individual openings, which are mutually separated by the central web. Alternatively, the pole opening can constitute a continuous V-shaped opening.

A pole opening with no central web can reduce any stray flux in the rotor, thereby enhancing efficiency or torque. Moreover, the inductance of the rotor in the circumferential direction can be reduced, which may result in the maximization of reluctance torque. Moreover, the demagnetization resistance of the pole magnets can be improved by the improvement of the working point thereof.

According to one form of embodiment of the invention, the ratio of the radial thickness of the web between the pole opening and an outer circumference of the rotor, at its circumferential edge, to the thickness of the web at the point of initial contact between a pole magnet and the web, lies between 0.7 and 1.2. The web can be considered as the partition between the pole opening and an outer circumference of the rotor. In the case of a V-shaped pole opening, this web has a varying thickness in the radial direction. The web, in a region of the pole opening which contains no pole magnet, can also be configured with a different thickness, in order to enhance the high-speed performance. The ratio described here refers to the thickness of the web at the edge of the opening and the thickness of the web at the point of initial contact of a pole magnet with said web. This ratio in particular results in an optimum high-speed performance.

BRIEF DESCRIPTION OF THE DRAWINGS

Forms of embodiment of the invention are described hereinafter with reference to the attached drawings, wherein neither the drawings nor the description constitute any limitation of the invention.

The figures are schematic only, and are not true to scale. In the figures, identical reference symbols identify identical features, or features having the same effect.

DETAILED DESCRIPTION

Figure 1:
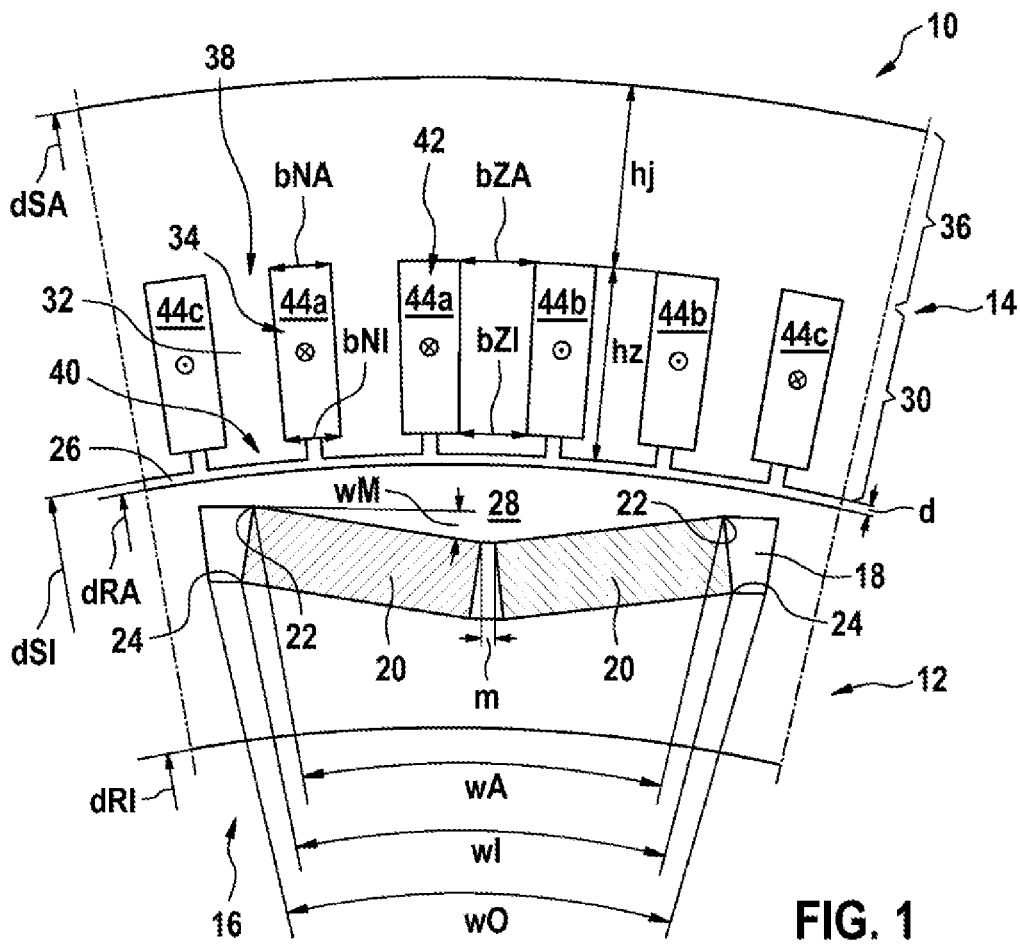
FIG. 1 shows a partial cross-section though an electrical machine according to one form of embodiment of the invention.

FIG. 1 shows a partial cross-section through an electrical machine 10 with a rotor 12, which is mounted inside a stator 14 for rotation about an axis. The partial cross-section encompasses one pole 16 of the rotor 12. The pole 16 is characterized by a V-shaped pole opening 18, in which two pole magnets 20 are accommodated. The two pole magnets 20 have a rectangular cross-section, and are oriented in a V-shape in relation to each other.

The two pole magnets have a geometrical angular offset wM of less than 15°. The angular offset wM of the two pole magnets 20 is here the angle through which the two magnets are in each case rotated in relation to one another such that, in combination, they constitute a V-shape. In combination, the two pole magnets are offset by 2*wM.

FIG. 1 additionally shows the radially outer pole coverage wA, the radially inner pole coverage wI and the opening coverage wO, all of which can be expressed as geometrical angles.

The outer pole coverage wA can be defined by the axial geometrical angle between radially outer edges 22, that are circumferentially on the outside, of the pole magnets 20. Ideally, the outer pole coverage wA lies between 123.5° el and 142.9° el. The angle is expressed in electrical degrees (° el), thus rendering it independent of the number of poles 16 of the rotor 12. Specifically, an electrical angle $w_{el}$ is determined as follows from the geometrical or mechanical angle $w_{mech}$ and the pole number p:

$$w_{el}=w_{mech}*p/2$$

The inner pole coverage wI can be defined by the axial geometrical angle between radially inner and circumferentially outer edges 24 of the pole magnets 20. Ideally, the inner pole coverage wI lies between 115.7° el and 133.2° el.

The minimum clearance m between the pole magnets 20, in the circumferential direction, is ideally less than 3 mm (even where a central web is present). The pole opening 18 represented in FIG. 1 has no central web. In this case, the clearance m between the pole magnets 20 can be even smaller than 1.5 mm.

Figure 2:
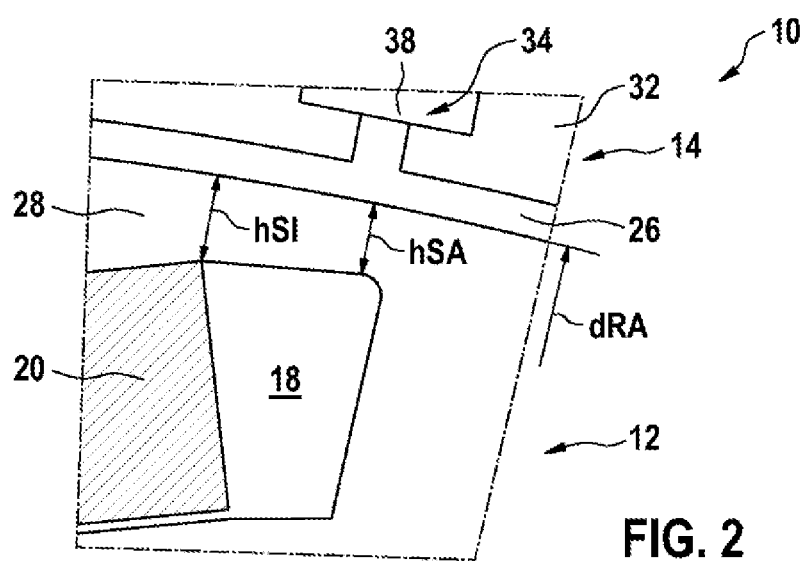
FIG. 2 shows a section of FIG. 1.

FIG. 2 shows a section of FIG. 1 in greater detail, including parameters for the web 28 which separates the pole opening 18 from an air gap 26, which is arranged between the rotor 12 and the stator 14. A radial thickness hSA of the web 28 between the pole opening 18 and an outer circumference of the rotor 12 at the edge of the web 28 or the pole opening 18, in the circumferential direction, and a radial thickness hSI of the web 28, at the initial point of contact of a pole magnet 20 with the web 28, are represented. Ideally, the ratio hSA/hSI lies between 0.7 and 1.2.

With reference to FIG. 1, the stator, in a tooth region 30, incorporates teeth 32, between which grooves 34 are constituted. The teeth 32 are secured by a yoke region 36, and the tooth root 38 thereof merges into said yoke region 36. At a tooth tip 40, which lies opposite the tooth root 38 and is oriented towards the rotor 12, the teeth are configured with a T-shape, such that virtually closed openings through the stator 14 are produced for the slots 34. The teeth 32, excluding the tooth tip 40, have an essentially trapezoidal cross-section. The grooves 34 have an essentially trapezoidal or rectangular cross-section.

In the grooves 34 a stator winding 42 is arranged, which comprises three phases 44a, 44b, 44c. In a plug-winding, the conductors of the stator winding 42 can have been plugged into the grooves 34 and interconnected at their ends.

As indicated in FIG. 1, six grooves 34 are assigned to one pole 16. Given three phases 44a, 44b, 44c, the electrical machine has a resulting slot number of q=2. Ideally, the electrical machine has a slot number q greater than or equal to 1.

In FIG. 1, the following parameters for the stator 14 are indicated:
  the tooth height hz, i.e. the radial distance from the internal diameter dSI of the stator 14 to the tooth root 38, or the radial height or thickness of the tooth region 30,
  the yoke thickness hj, i.e. the radial distance from the tooth root 38 to the external diameter dSA of the stator 14, or the radial height or thickness of the yoke region 36,
  the tooth width bZA at the tooth root 38, i.e. at the radially outermost position,
  the tooth width bZI at the tooth tip 40, i.e. at the radially innermost position,
  the groove width bNA at the tooth root 38, i.e. at the radially outermost position,
  the groove width bNI at the tooth tip 40, i.e. at the radially innermost position.

For the stator 14, there are two alternative parameter sets which, together with the parameters indicated above, are optimum for the rotor 12:
  Parameter set I:
  Ratio hz/hj of the tooth height to the yoke thickness: 0.959-1.126
  Ratio bZA/bNA of the tooth width to the groove width at the tooth root 38: 1.23-1.35
  Ratio bZI/bNI of the tooth width to the groove width at the tooth tip 40: 1.03-1.14
  Ratio hNA/hNI of the groove widths at the tooth root 38 and at the tooth tip 40: 0.9-1.1
  Parameter set II:
  Ratio hz/hj of the tooth height to the yoke thickness: 1.395-1.6376
  Ratio bZA/bNA of the tooth width to the groove width at the tooth root 38: 1.33-1.47
  Ratio bZI/bNI of the tooth width to the groove width at the tooth tip 40: 1.06-1.19
  Ratio hNA/hNI of the groove widths at the tooth root 38 and at the tooth tip 40: 0.9-1.1

The parameters can be achieved, for example, with an external diameter of the stator dSA between 110 mm and 500 mm.

The ratio dSI/dSA of the internal diameter dSI to the external diameter dSA of the stator can ideally range between 0.75 and 0.85.

Moreover, an optimum ratio d/dSI of the thickness of the air gap d to the internal diameter dSI of the stator 14 of between 0.0025 and 0.0055 has emerged.

Figure 3:
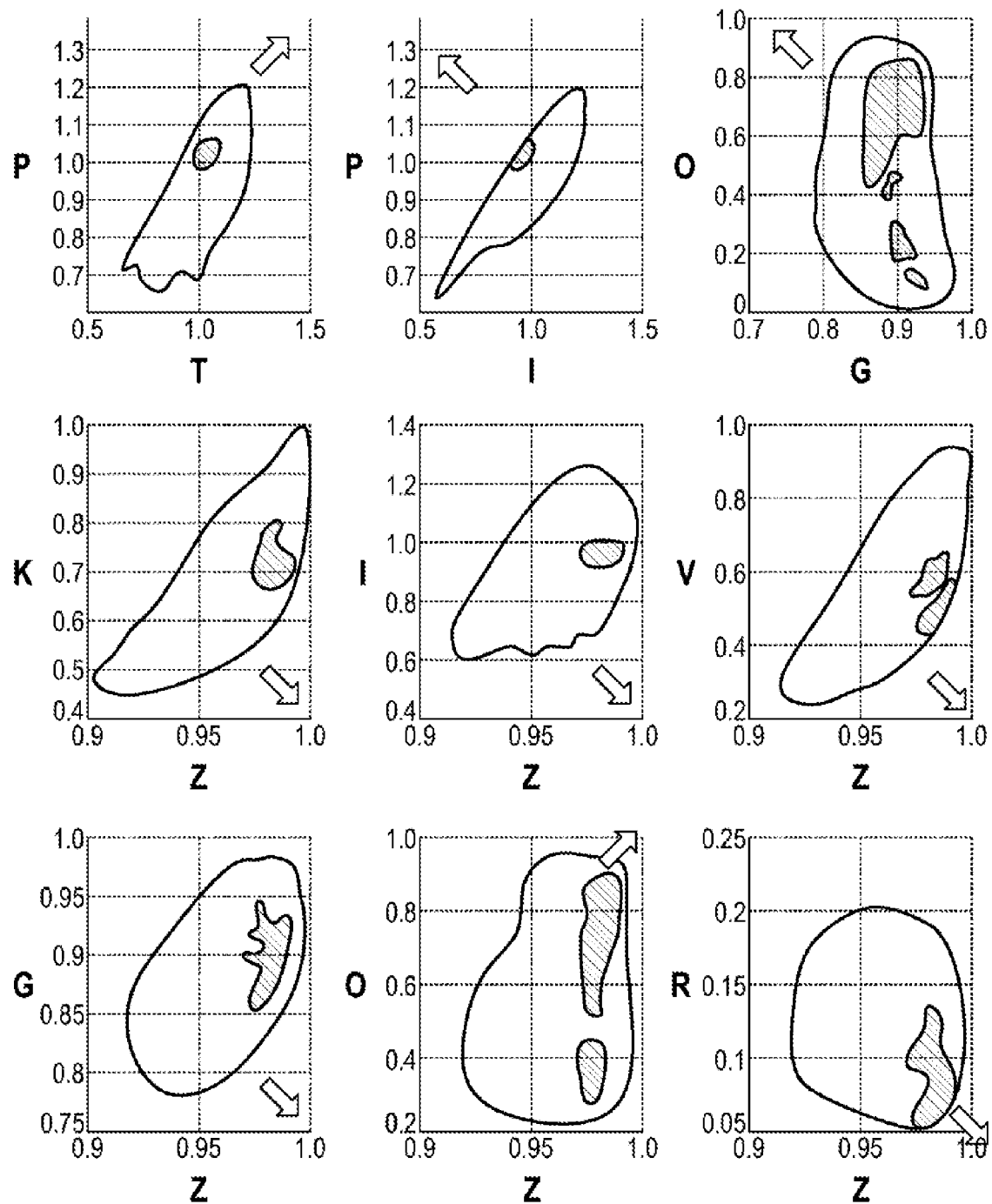
FIG. 3 shows diagrams which illustrate the optimization of the electrical machine represented in FIGS. 1 and 2.

FIG. 3 shows the results of a multi-objective optimization, which results in the above-mentioned parameter combinations. FIG. 3 includes diagrams in which two target values for the electrical machine 10 are represented in each case. It is significant that the above-mentioned geometrical parameters define the electrical machine whereas, in multi-objective optimization, optimization parameters are optimized, which are influenced by geometrical parameters.

Each multidimensional point defined by the two optimization parameters in the diagrams can thus be considered as a dedicated design point of an electrical machine. By means of a recursive optimization algorithm, starting from one point, further optimum points are then identified. All the points considered by the algorithm are plotted in the diagrams as outlined areas.

The arrow in each of the diagrams indicates where the optimum design point would be located, with respect to the two optimization parameters which are plotted in the diagram. However, this point cannot be achieved in the event of mutually conflicting individual objectives. Only a relative optimum for all the optimization objectives can be determined. The points in the shaded areas represent sets of optimization parameters, in which all optimization parameters assume their most optimum form. From these optimum optimization parameters, intervals for the above-mentioned geometrical parameters for the electrical machine 10 were then derived.

The following optimization parameters are represented, and have been optimized:
  The maximum torque T must be maximized.
  The maximum power P must be maximized.
  The short-circuit current I must be minimized.
  The noise level G must be minimized.
  The tonality O must be maximized.
  The cyclic efficiency Z must be maximized.
  Material costs K must be minimized.
  Losses V must be minimized.
  The torque ripple R must be minimized.

The cyclic efficiency Z is significant for hybrid and electric vehicles, as it has a direct influence upon the range.

All the parameters indicated are standardized in relation to a specified maximum value.

Finally, it should be observed that terms such as "having", "comprising", etc. do not exclude any further elements or steps, and terms such as "a" or "one" do not exclude the plural. Reference symbols in the claims are not to be considered as a limitation.

The invention claimed is:

1. An electrical machine (10) for driving a vehicle, the electrical machine comprising:
    a stator (14) having stator grooves (34) running axially, and running uniformly around an axis of the electrical machine (10), through which grooves a stator winding (42) runs, wherein the stator (14):
        has a ratio of a tooth height (hz) to a yoke thickness (hj) between 0.959 and 1.126;
        has a ratio of a tooth width (bZA) to a groove width (bNA) at a tooth root (38) between 1.23 and 1.35;
        has a ratio of a tooth width (bZI) to a groove width (bNI) at a tooth tip (40) between 1.03 and 1.14; and
        has a ratio of the groove width (bNA) at the tooth root (38) to the groove width (bNI) at the tooth tip (40) between 0.9 and 1.1; and
    a rotor (12) with axially oriented poles (16), wherein the rotor is mounted inside the stator (14) for rotation about the axis of the electrical machine (10),
    wherein the electrical machine (10) has a slot number greater than or equal to 1,
    wherein the tooth height (hz) is a radial height over which teeth extend, wherein the yoke thickness (hj) is a radial height of a yoke of the stator, wherein the tooth root (38) is at the transition between the teeth and the yoke,
    wherein two pole magnets (20) of rectangular cross-section are arranged in each pole (16) of the rotor (12) in an axially oriented pole opening (18), forming a V in respect of one another,
    wherein a geometrical angular offset (wM) of the two pole magnets (20), by which the two pole magnets (20) are offset in a V-shaped arrangement in relation to one another, is less than 15°;
    wherein an electrical angle of an outer pole coverage (wA) lies between 115.7° el and 133.2° el;
    wherein an electrical angle of an inner pole coverage (wI) lies between 123.5° el and 142.9° el;
    wherein an electrical angle is determined as a geometrical angle multiplied by one half of a number of poles (16) of the rotor (12);
    wherein the outer pole coverage (wA) is determined by an axial geometrical angle by which the two pole magnets (20) cover on a radially outer side of the pole opening (18),
    wherein the axial geometrical angle is between radially outer and circumferentially outer edges of the two pole magnets (20);
    wherein the inner pole coverage (wI) is determined by a second axial geometrical angle which the two pole magnets (20) cover on a radially inner side of the pole opening (18); and
    wherein the second axial geometrical angle is between radially inner and circumferentially outer edges of the two pole magnets (20).

2. The electrical machine (10) as claimed in claim 1, wherein an external diameter of the stator (dSA) lies between 110 and 500 mm.

3. The electrical machine (10) as claimed in claim 1, wherein a ratio of an internal diameter (dSI) to an external diameter (dSA) of the stator (14) lies between 0.75 and 0.85.

4. The electrical machine (10) as claimed in claim 1, wherein a ratio between a width (d) of an air gap (26) between the stator (14) and the rotor (12) and an internal diameter (dSI) of the stator (14) lies between 0.0025 and 0.0055.

5. The electrical machine (10) as claimed in claim 1, wherein a clearance (m) between two pole magnets (20) in a pole (16), in a circumferential direction, is less than 3.0 mm.

6. The electrical machine (10) as claimed in claim 1, wherein the pole opening (18) is V-shaped, and has no central web.

7. The electrical machine (10) as claimed in claim 1, wherein a ratio of a radial thickness (hSA) of the web (28) between the pole opening (18) and an outer circumference of the rotor (12), at an circumferential edge, to a thickness (hSI) of the web (28) at a point of initial contact between a pole magnet (20) and the web (28), lies between 0.7 and 1.2.

8. An electrical machine (10) for driving a vehicle, the electrical machine comprising:
    a stator (14) having stator grooves (34) running axially, and running uniformly around an axis of the electrical machine (10), through which grooves a stator winding (42) runs, wherein the stator (14):
        has a ratio of the tooth height (hz) to the yoke thickness (hj) between 1.395 and 1.6376;
        has a ratio of the tooth width (bZA) to the groove width (bNA) at the tooth root (38) between 1.33 and 1.47;
        has a ratio of the tooth width (bZI) to the groove width (bNI) at the tooth tip (40) between 1.06 and 1.19; and
        has a ratio of the groove width (bNA) at the tooth root (38) to the groove width (bNI) at the tooth tip (40) between 0.9 and 1.1; and
    a rotor (12) with axially oriented poles (16), wherein the rotor is mounted inside the stator (14) for rotation about the axis of the electrical machine (10),
    wherein the electrical machine (10) has a slot number greater than or equal to 1,
    wherein the tooth height (hz) is a radial height over which teeth extend, wherein the yoke thickness (hj) is a radial height of a yoke of the stator, and wherein the tooth root (38) is at the transition between the teeth and the yoke
    wherein two pole magnets (20) of rectangular cross-section are arranged in each pole (16) of the rotor (12) in an axially oriented pole opening (18), forming a V in respect of one another,
    wherein a geometrical angular offset (wM) of the two pole magnets (20), by which the two pole magnets (20) are offset in a V-shaped arrangement in relation to one another, is less than 15°;
    wherein an electrical angle of an outer pole coverage (wA) lies between 115.7° el and 133.2° el;
    wherein an electrical angle of an inner pole coverage (wI) lies between 123.5° el and 142.9° el;
    wherein an electrical angle is determined as a geometrical angle multiplied by one half of a number of poles (16) of the rotor (12);
    wherein the outer pole coverage (wA) is determined by an axial geometrical angle by which the two pole magnets (20) cover on a radially outer side of the pole opening (18),
    wherein the axial geometrical angle is between radially outer and circumferentially outer edges of the two pole magnets (20);

wherein the inner pole coverage (wI) is determined by a second axial geometrical angle which the two pole magnets (20) cover on a radially inner side of the pole opening (18); and wherein the second axial geometrical angle is between radially inner and circumferentially outer edges of the two pole magnets (20).

9. The electrical machine (10) as claimed in claim 8, wherein an external diameter of the stator (dSA) lies between 110 and 500 mm.

10. The electrical machine (10) as claimed in claim 8, wherein a ratio of an internal diameter (dSI) to an external diameter (dSA) of the stator (14) lies between 0.75 and 0.85.

11. The electrical machine (10) as claimed in claim 8, wherein a ratio between a width (d) of an air gap (26) between the stator (14) and the rotor (12) and an internal diameter (dSI) of the stator (14) lies between 0.0025 and 0.0055.

12. The electrical machine (10) as claimed in claim 8, wherein a clearance (m) between two pole magnets (20) in a pole (16), in a circumferential direction, is less than 3.0 mm.

13. The electrical machine (10) as claimed in claim 8, wherein the pole opening (18) is V-shaped, and has no central web.

14. The electrical machine (10) as claimed in claim 8, wherein a ratio of a radial thickness (hSA) of the web (28) between the pole opening (18) and an outer circumference of the rotor (12), at an circumferential edge, to a thickness (hSI) of the web (28) at a point of initial contact between a pole magnet (20) and the web (28), lies between 0.7 and 1.2.

* * * * *